United States Patent Office 3,081,339
Patented Mar. 12, 1963

3,081,339
DERIVATIVES OF NITRO AND AMINO ARALKYL-
ENE THIO - HYDROQUINONE - O,O'-DIACETATE
AND PREPARATION THEREOF
Milton Green, Newton Highlands, and Howard G. Rogers, Weston, Mass., assignors to Polaroid Corporation, Cambridge, Mass., a corporation of Delaware
No Drawing. Original application June 6, 1957, Ser. No. 663,876, now Patent No. 3,009,958, dated Nov. 21, 1961. Divided and this application Mar. 6, 1961, Ser. No. 93,303
15 Claims. (Cl. 260—479)

This application is a division of our application, Serial No. 663,876, filed June 6, 1957, now U.S. Patent No. 3,009,958, issued November 21, 1961.

This invention relates to chemistry and more particularly to novel chemical compounds and processes.

One object of this invention is to provide novel chemical compounds.

Another object of this invention is to provide syntheses for preparing these novel compounds.

Further objects of this invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

We have discovered novel chemical compounds of the general formula:

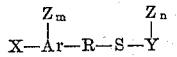

wherein X is a nitro or amino group, either primary, secondary or tertiary amino; R is an alkylene group, preferably an alkylene group containing no more than 5 carbon atoms; Ar is an aryl nucleus, such as a benzene or naphthalene nucleus; each Z is an alkyl group, preferably lower alkyl such as methyl or ethyl, or a halogen, such as chlorine; $m$ is 0, 1 or 2; $n$ is 0, 1, 2 or 3; and Y is a 2,5-bis-acyloxyphenyl group.

In the preferred embodiment, the nucleus Ar is a benzene nucleus; Y is a 2,5-bis-acyloxy benzene nucleus; and R is an ethylene group.

The preferred compounds of this invention are:

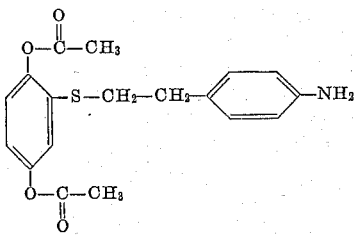

(1) p-Aminophenethyl-thio-hydroquinone-O,O'-diacetate

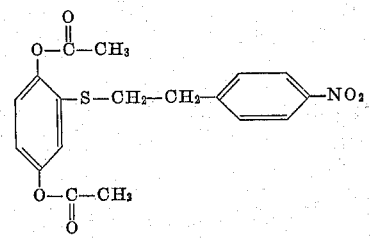

(2) p-Nitrophenethyl-thio-hydraquinone-O,O'-diacetate

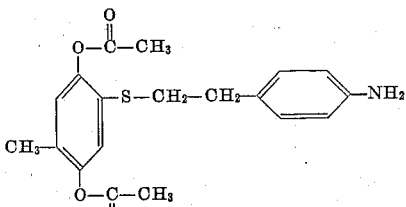

(3) p-Aminophenethyl-thio-toluhydroquinone-O,O'-diacetate

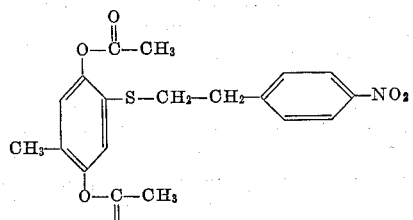

(4) p-Nitrophenethyl-thio-toluhydroquinone-O,O'-diacetate

In general, the novel compounds of this invention may be prepared by alkylation of a substituted or unsubstituted mercaptohydroquinone by reaction with the appropriate haloalkyl derivative of a nitro aryl compound, e.g., a haloalkyl substituted nitrobenzene or nitronaphthalene, by refluxing in the presence of a stoichiometric quantity of alkali until alkylation is substantially completed.

One method of preparing compounds within the scope of this invention comprises reacting a substituted or unsubstituted mercaptohydroquinone with a compound of the general formula

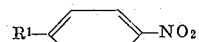

wherein $R^1$ is a haloalkyl group, e.g., p-nitrophenethyl bromide. The resultant product

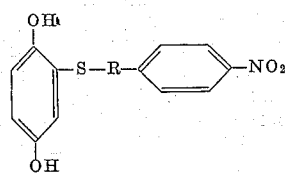

may be: (1) directly reduced to yield

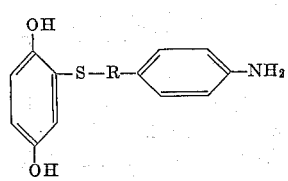

or (2) acetylated to yield

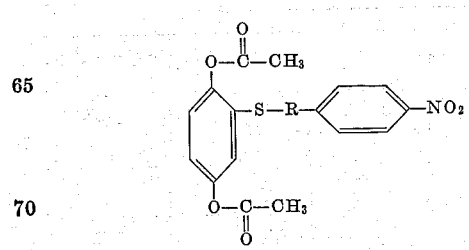

which is then reduced to yield

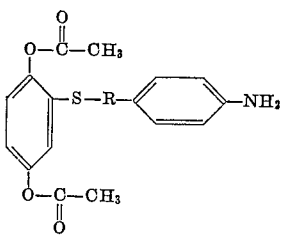

which may be hydrolyzed to yield

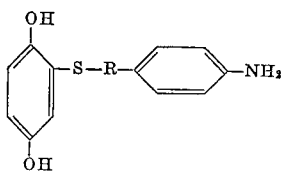

It is to be understood that the acyloxy compounds may also be prepared by the selective acylation of the hydroxyl groups in a manner similar to that described in the copending application of Milton Green and Helen P. Husek, Serial No. 612,063, filed September 25, 1956, and now abandoned.

The acyloxy compounds of this invention may be present in the form of acid addition salts, such as the hydrochloride.

If desired, the secondary or tertiary amino derivatives may be obtained by appropriate alkylation of the primary amine.

The following examples are given to illustrate the preparation of compounds within the scope of this invention, and are intended to be illustrative only.

*Example 1*

2-mercapto-hydroquinone is prepared according to the procedure of Alcaley in Helv. Chim. Acta 30, pages 578 to 584 (1947).

A mixture of 26 g. of 2-mercapto-hydroquinone, 42 g. of p-nitrophenethyl-bromide and 7.3 g. of sodium hydroxide in a solution of 210 cc. of methanol is refluxed under nitrogen for one hour, then acidified with 20 cc. of concentrated hydrochloric acid. The solvent is removed in vacuo. The residue is taken up in water and extracted with ether. The ether layer is dried and the remaining solvent removed. The resultant orange residue is extracted from benzene yielding 36 g. of an orange solid, p-nitrophenethyl-thio-hydroquinone, melting at 118 to 120° C.

The product is added to 180 cc. of acetyl chloride containing 1 cc. of concentrated sulfuric acid and refluxed for 2 hours. The solution is cooled, poured into 3 liters of ice water and allowed to stand until the material has solidified. The resultant solid is filtered and extracted from isopropyl alcohol, to yield 30 g. of white crystals, p-nitrophenethyl-thio-hydroquinone-O,O'-diacetate, melting at 98 to 100° C.

Analysis of this product:

|  | C | H | N |
|---|---|---|---|
| Calculated | 57.8 | 4.6 | 3.7 |
| Found | 57.6 | 4.6 | 3.7 |

The p-nitrophenethyl-thio-hydroquinone-O,O'-diacetate is reduced by dissolving 15 g. in 350 cc. of ethanol, adding 1 g. of platinum oxide, and treating with hydrogen under two atmospheres pressure. The resultant product p-aminophenethyl-thio-hydroquinone-O,O'diacetate, theoretical yield 13.8 g., could not be crystallized. Dissolving the product in a mixture of 40 cc. of 3 N hydrochloric acid and 60 cc. of water, the resulting solution can be used directly in subsequent diazotization reactions.

*Example 2*

A mixture of 26 g. of 2-mercapto-hydroquinone, 42 g. of p-nitrophenethyl-bromide and 7.3 g. of sodium hydroxide in a solution of 210 cc. of methanol is refluxed under nitrogen for one hour, then acidified with 20 cc. of concentrated hydrochloric acid. The solvent is removed in vacuo. The residue is taken up in water and extracted with ether. The ether layer is dried and the remaining solvent removed. The resultant orange residue is extracted from benzene yielding 36 g. of an orange solid, p-nitrophenethyl-thio-hydroquinone, melting at 118 to 120° C. The p-nitrophenethyl-thio-hydroquinone is reduced by dissolving 15 g. in 350 cc. of ethanol, adding 5 g. of palladium-barium sulfate catalyst and treating with hydrogen under two atmospheres pressure. After substantially complete reaction, the product is filtered, the solvent removed and the residue crystallized from a benzene-hexane mixture yielding a solid, p-aminophenethyl-thio-hydroquinone, melting at 121 to 123° C.

Analysis of this product:

|  | C | H | N |
|---|---|---|---|
| Calculated | 64.4 | 5.8 | 5.4 |
| Found | 64.3 | 5.7 | 5.3 |

*Example 3*

2-mercapto-toluhydroquinone is reacted with p-nitrophenethyl-bromide according to the procedure of Example 1. The resultant product, p-nitrophenethyl-thio-toluhydroquinone melts at 123 to 125° C.

The product p-nitrophenethyl-thio-toluhydroquinone is acetylated according to the procedure of Example 1 to yield p-nitrophenethyl-thio-toluhydroquinone-O,O'-diacetate melting at 89 to 91° C. which is reduced to p-aminophenethyl-thio-toluhydroquinone-O,O'-diacetate.

*Example 4*

2-mercapto-toluhydroquinone is reacted with p-nitrophenethyl-bromide according to the procedure of Example 2 to yield p-nitrophenethyl-thio-toluhydroquinone which is reduced to yield p-aminophenethyl-thio-toluhydroquinone.

The copending application of Milton Green and Howard G. Rogers, Serial No. 663,906, filed June 6, 1957, (now abandoned and replaced by Serial No. 62,093, filed October 12, 1960), discloses and claims certain novel compositions, methods and processes for the utilization of the thio-hydroquinones of this invention as highly useful photographic developing agents.

The novel acyl compounds of this invention are highly useful chemical intermediates. They are especially useful in reactions wherein it is desired that reaction be restricted to the amino group, and also where it is desired that the hydroxyl groups be protected during reaction and yet readily regenerated after the reaction is completed.

In particular, the novel acyl compounds of this invention, having a primary amino group, are highly useful as intermediates in the preparation of azo compounds. It is well known that free hydroquinone groups will rapidly reduce diazonium salts. Thus it is practically impossible to diazotize an amino compound in the presence of a free hydroquinone group. The novel acyl compounds of this invention, however, may be readily diazotized and thus are highly valuable in the preparation of azo compounds, for example as disclosed and claimed in the copending application of Milton Green and Howard G. Rogers, Serial No. 663,905, filed June 6, 1957.

Since certain changes may be made in the above products and processes without departing from the scope of the invention herein involved, it is intended that all matter contained in the above description shall be interpreted as illustrative and not in a limiting sense.

What is claimed is:

1. Chemical compounds selected from the group consisting of compounds within the formula:

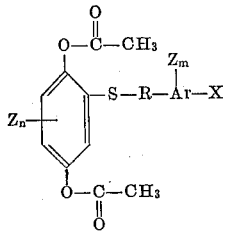

wherein X is selected from the group consisting of nitro and primary amino groups; R is an alkylene group containing no more than five carbon atoms; each Z is selected from the group consisting of lower alkyl and halogen groups; m is selected from the group consisting of 0, 1 and 2; n is selected from the group consisting of 0, 1, 2 and 3; and Ar is a member of the group consisting of benzene and naphthalene nuclei.

2. Chemical compounds as defined in claim 1, wherein Ar is a benzene nucleus.

3. Chemical compounds as defined in claim 1, wherein R is a —$CH_2$—$CH_2$— group.

4. p - Aminophenethyl - thio - hydroquinone - O,O'-diacetate.

5. p - Nitrophenethyl - thio - hydroquinone - O,O'-diacetate.

6. p - Aminophenethyl - thio - toluhydroquinone - O,O'-diacetate.

7. p - Nitrophenethyl - thio - toluhydroquinone - O,O'-diacetate.

8. The process which comprises refluxing a compound selected from the group consisting of compounds within the formula:

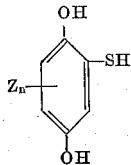

wherein each Z is selected from the group consistnig of lower alkyl and halogen groups and n is selected from the group consisting of 0, 1, 2 and 3, with a compound selected from the group consisting of compounds within the formula:

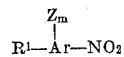

wherein $R^1$ is a haloalkyl group containing no more than five carbon atoms, Ar is an aryl nucleus selected from the group consisting of benzene and naphthalene nuclei, and m is selected from the group consisting of 0, 1 and 2, and acylating the hydroxy groups.

9. The process as defined in claim 8 wherein Ar is a benzene nucleus.

10. The process as defined in claim 8 including the step of reducing the nitro group.

11. The process as defined in claim 8 wherein the acylating agent is acetyl chloride.

12. The process of preparing p-nitrophenethyl-thio-hydroquinone-O,O'-diacetate which comprises refluxing p-nitrophenethylbromide and 2-mercapto hydroquinone, to obtain p-nitrophenethyl-thio-hydroquinone and acetylating said p-nitrophenethyl-thio-hydroquinone.

13. The process of preparing p-nitrophenethyl-thio-toluhydroquinone-O,O'-diacetate which comprises refluxing p-nitrophenethyl-bromide and 2-mercapto-toluhydroquinone, to obtain p-nitrophenethyl-thio-toluhydroquinone and acetylating said p - nitrophenethyl - thio - toluhydroquinone.

14. The process of preparing p-aminophenethyl-thio-hydroquinone-O,O'-diacetate which comprises refluxing p-nitrophenethyl-thio-hydroquinone and acetyl chloride, to obtain p-nitrophenethyl-thio-hydroquinone-O,O'-diacetate and reducing said p - nitrtophenethyl - thio - hydroquinone-O,O'-diacetate to p - aminophenethyl - thio - hydroquinone-O,O'-diacetate.

15. The process of preparing p-aminophenethyl-thio-toluhydroquinone-O,O'-diacetate which comprises refluxing p-nitrophenethyl-thio-toluhydroquinone and acetyl chloride, to obtain p-nitrophenethyl-thio-toluhydroquinone, O,O'-diacetate and reducing said p-nitrophenethyl-thio-toluhydroquinone-O,O'-diacetate to p-aminophenethyl-thio-toluhydroquinone-O,O'-diacetate.

References Cited in the file of this patent
UNITED STATES PATENTS 2,748,160    Reynolds et al. _____ May 29, 1956
2,799,698    Taves _____ July 16, 1957